May 18, 1926.

E. A. SAVARY

ADJUSTING DEVICE FOR TIRE CHAINS

Filed Dec. 26, 1925

1,585,514

INVENTOR
Eugene A. Savary.
BY
ATTORNEYS

Patented May 18, 1926.

1,585,514

UNITED STATES PATENT OFFICE.

EUGENE A. SAVARY, OF PHOENICIA, NEW YORK.

ADJUSTING DEVICE FOR TIRE CHAINS.

Application filed December 26, 1925. Serial No. 77,865.

This invention relates to a device for adjusting tire chains which are used to prevent the wheel from skidding and it fundamentally provides a plurality of resilient rods connected to the side chain and hooked to the resilient unit of a rod.

The invention is designed to provide each of the rods with a series of spring loop members for connecting the succeeding rod each loop being adapted for adjusting the rod so as to tension the chain and to fit it for different diameters of wheels.

The invention resides more particularly in the novel combinations hereinafter described and claimed, reference being made to the accompanying drawing in which:—

Figure 1:
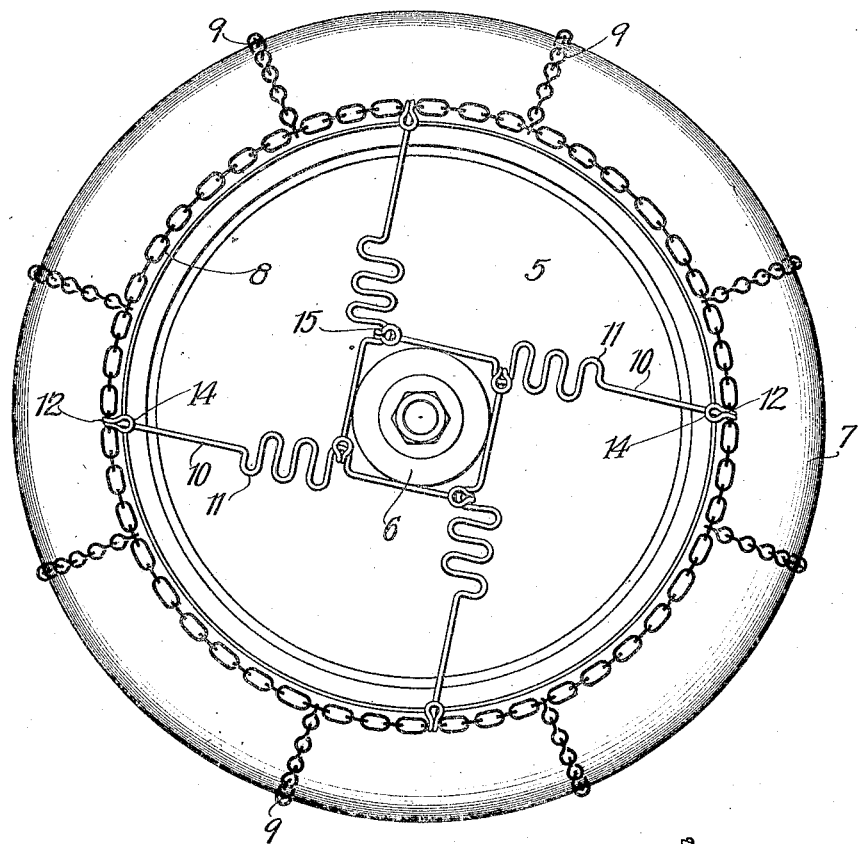
Fig. 1 represents a side elevation of a device embodying this invention.
Figure 2:
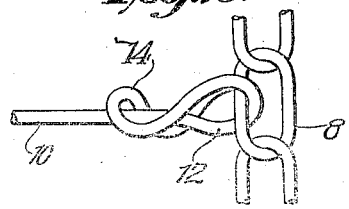
Fig. 2 is a perspective view of a chain hook.
Figure 3:
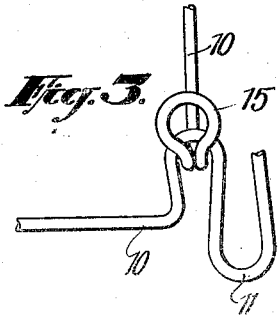
Fig. 3 is a detail side view of a loop hook.

In the drawing the numeral 5 designates a wheel having a hub 6 and a tire 7 made to contact with the ground. The device for preventing the wheel from slipping as it rolls along the ground consists of a side or circumferential chain 8 having linked thereto a series of transverse chains 9 leading over the tire to a circumferential chain on the other side of the tire as is well-known.

The device for adjusting the side chain includes a plurality of rods 10 preferably four in number each having a series of loop members 11 forming an integral part of the rod. Each rod is resilient and it has a hook 12 at one end whereby it is connected to the side chain. The hook is provided with a flat spring mousing 14 to prevent it from unshipping from the chain. The other end of the rod is equipped with a hook 15 for engagement with one of the loops.

As shown in the drawing the rods when connected to the chains and loops embrace the hub to take up longitudinal as well as side strains. The loops are intended to give each rod a certain amount of spring or resiliency and at the same time offer means for proper adjustment. In order to take up the slack of the side chain the hook 15 can be slipped from the loop which it engages to the next loop of the same row thus tightening the chain. The spring loops take up by their expansion any tendency of the chain to centrifugally move when the wheel is revolving.

The four rods take up the strain equally between them in any direction and being springy they will resume their normal positions. When the four rods are connected together as indicated in Fig. 1 the inner portions substantially form a rectangle about the hub and the clearance can be adjusted by shifting the rods to hook into one of the loops to or from the hub. The chain adjuster being made of only four parts can be readily packed and shipped and by its simplicity it does not require any mechanic to connect or adjust it.

In this device the four rods by being hooked together and by the compression and expansion of the loops as shown equalize any pull or slack on the chains coacting with the tire.

I claim:—

1. A tire chain adjusting device comprising a plurality of resilient rods each having an end adapted to be hooked to a side chain and the other end hooked to the succeeding rod, and means for adjusting the latter end of the rod.

2. A tire chain adjusting device comprising a plurality of rods each having a series of spring loops one end of the rod being adapted to be hooked to a side chain and the other end hooked to a loop of the succeeding rod, said latter end being made to adjust the rod by shifting it from a loop of one series to another loop of the same series.

3. A chain adjusting device comprising a plurality of transverse chains, side chains linked to the transverse chains, a plurality of rods connected to the side chain each having a series of loop portions formed in the rod, a hook at one end of the rod for connecting the rod to a side chain, a hook at the other end of the rod for engagement with a loop of a succeeding rod, said latter end of the rod being adjustable by slipping the hook from one to the other of said loops.

In testimony whereof I have hereunto set my hand.

EUGENE A. SAVARY.